V. DI SANTE.
AIR FILTER.
APPLICATION FILED OCT. 7, 1918.
1,319,574.
Patented Oct. 21, 1919.
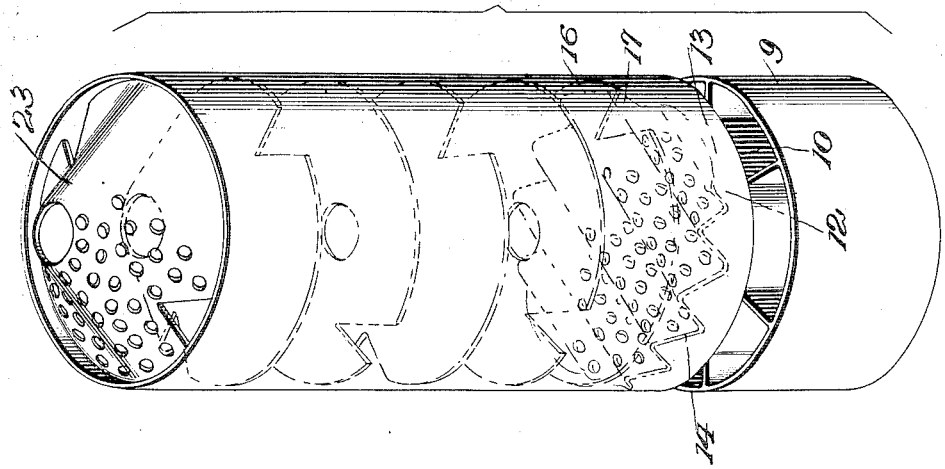
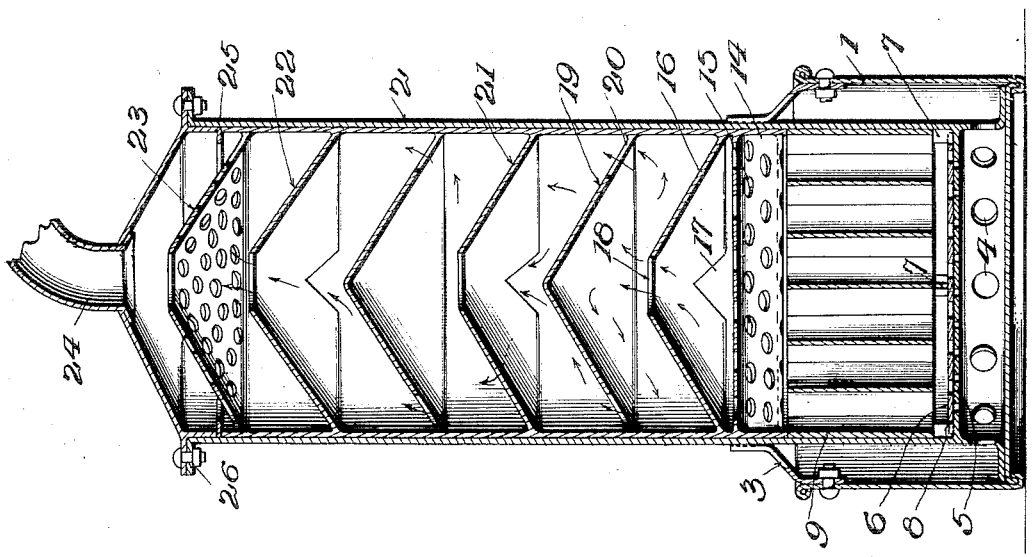
Inventor
Vito Di Sante.
By [signature]
Attorney

UNITED STATES PATENT OFFICE.

VITO DI SANTE, OF WICHITA, KANSAS.

AIR-FILTER.

1,319,574.   Specification of Letters Patent.   Patented Oct. 21, 1919.

Application filed October 7, 1918. Serial No. 257,240.

*To all whom it may concern:*

Be it known that I, VITO DI SANTE, of Wichita, in the county of Sedgwick and State of Kansas, have invented certain new and useful Improvements in Air-Filters; and I do hereby declare the following to be a full, clear, and exact description of the invention, such as will enable others skilled in the art to which it appertains to make and use the same.

This invention is a further elaboration of the air filter for internal combustion engines embraced by Letters Patent No. 1,288,393, issued to me December 17, 1918.

Figure 1 is a central vertical sectional view. Fig. 2 is a perspective of the interior parts of the collecting vessel removed.

1 designates the water container and 2 the collecting vessel. Both are preferably of cylindrical form and the vessel is mounted upright in the container and secured thereto by brackets 3. Near its lower end the vessel is formed with inlet apertures 4 and above these is a perforated plate 5. A second perforated plate 6 rests upon plate 5 and its perforations are out of alinement with those of plate 5. Plate 5 is fixed in the vessel but plate 6 is free to move vertically under the suction action. It is held as against axial turn by lugs 7 formed on the walls of the vessel and received by notches 8 in the plate.

Above these plates I have shown the vessel containing a chamber 9 formed with a series of compartments. The chamber is of cylindrical form and is made with two concentric walls 10 and 12, the circular spaces formed by these walls being divided by partitions 13. The construction described prevents splashing when the device is applied to the engine of an automobile traveling over rough roads.

Above the chamber I have shown a tray 14 whose bottom surface is fluted, the flutes being perforated as at 15.

Above the tray is a superposed series of conical plates. The lowermost plate 16 is shown formed with notches 17 in its edges and a central opening 18. The plate 19 next above is likewise formed with notches 20 in its edges but they are disposed at right angles to those of plate 16. The plate 19 is imperforate at its top. The alternate plates of the series are of corresponding construction and arrangement, the plate 21 having a central opening and likewise the topmost plate 22. Thus the course of the suction is as indicated by the darts so that ample opportunity will be afforded by the water or other liquid to drain back into the container.

I have shown a top 23 which is of conical shape and perforated over its entire surface and formed with a central opening in line with the pipe 24 leading to the carbureter. This central opening tends to weaken the suction and avoid the tendency of the liquid being entrained with the air.

The tray 14 and all of the plates, as well as the cover, are preferably made of one piece held within the vessel by a washer 25 and the cover of the vessel is bolted as at 26.

As in my former patent and co-pending applications, Serial Nos. 257,238 and 257,239 my object is to provide improvements in the baffling means so that while the air and liquid may pass through the filter, the liquid will be gradually arrested in successive stages and allowed to return to the container. The present form has been found most effective under certain conditions.

I claim as my invention:

1. In an air filter, a water container, a collecting vessel mounted within said container, a superposed series of alternate conical plates in said vessel having notches in their edges and openings in their centers, and an intermediate series of conical plates having notches in their edges disposed at right angles to those of said alternate plates, and closed at their centers.

2. In an air filter, a water container, a collecting vessel mounted within said container, a fluted and perforated tray within and near the bottom of said vessel, to initially arrest and return the water, and a directly superposed series of conical plates above said tray having notches in their edges, the alternate plates having central openings and the intermediate plates closed at their centers and having their notches disposed at right angles to those of said alternate plates to gradually and successively arrest and return the water.

In testimony whereof, I have signed this specification.

VITO DI SANTE.